UNITED STATES PATENT OFFICE.

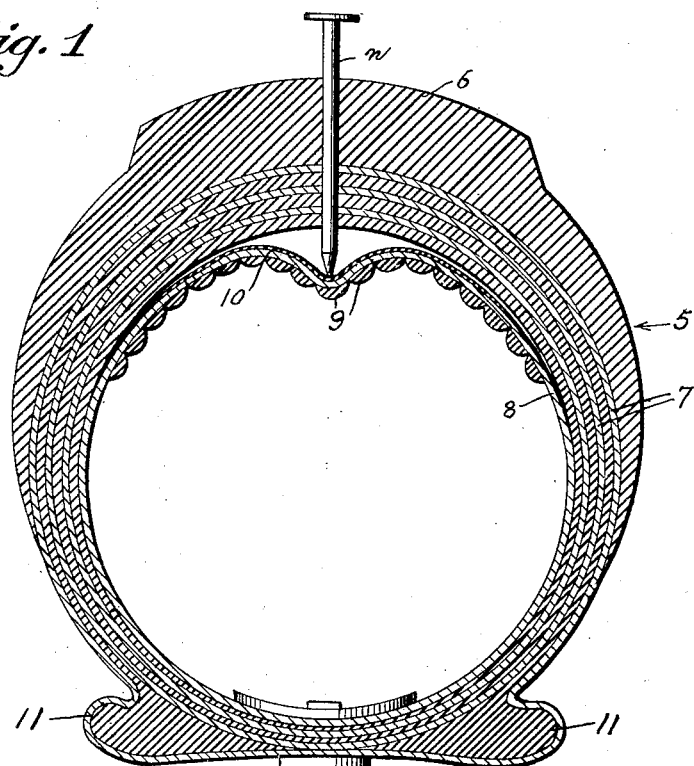

DOYLE PATCHIN AND GEORGE PATCHIN, OF SHAWNEE, OKLAHOMA.

PNEUMATIC PUNCTUREPROOF SINGLE-TUBE TIRE.

1,409,762. Specification of Letters Patent. Patented Mar. 14, 1922.

Application filed June 3, 1921. Serial No. 474,802.

*To all whom it may concern:*

Be it known that we, DOYLE PATCHIN and GEORGE PATCHIN, citizens of the United States, residing at Shawnee, in the county of Pottawatomie, and State of Oklahoma, have invented certain new and useful Improvements in Pneumatic Punctureproof Single-Tube Tires, of which the following is a specification.

This invention relates to tires, and more specifically to an improved puncture-proof single-tube tire.

The main object of this invention is to provide an improved tire which is provided with rim-engaging beads which are primarily spaced from one another a distance less than the normal distance between these beads, that is, the distance between the beads when the tire is inflated; thereby utilizing the internal pressure of air for increasing the distance between the beads and causing the latter to engage with the corresponding beads of an ordinary clincher rim.

Another object of this invention is to provide an improved tire tread which is substantially puncture-proof, and in which the inner lining has its outer portion free from the body of the tire and provided with internally extending humps which render the inner lining difficult to puncture, the inner portion of this lining vulcanized or otherwise fixed to the body of the tire.

Other objects and advantages will be pointed out or implied in the following details of description in connection with the accompanying drawings in which:

Figure 1 is a transverse sectional view through a tire constructed according to our invention.

Figure 2 is a fragmental section of the tire, the plane of this section being spaced from the valve through which the air is introduced.

Figure 3 is a view similar to Figure 2, but illustrating a modified form of the invention.

Referring to these drawings in detail, in which similar reference characters correspond with similar parts throughout the several views, and in which the valve $v$ may be of any appropriate construction, the invention consists in the construction and arrangement of parts as will now be described.

The body of the tire is indicated at 5, its tread portion 6 being preferably composed of rubber and being very thick so as to resist the tendency of a nail or the like to puncture the tire. The interior portion of the tire is preferably formed of alternate layers of rubber and fibrous material, as indicated at 7, and the inner lining 8 is preferably formed with inwardly extending humps 9 which are arranged edge to edge and form an additional safe guard against puncture. Between the inner lining 8 and the body of the tire we may provide a sheet 10 of tough rubber or other material which is extremely difficult to puncture, and this sheet 10 is preferably secured to the inner lining. If a nail should penetrate the tread as indicated at $n$ the point of the nail would press the inner lining and sheet 9 inward, as indicated in Figure 1, without puncturing this inner lining.

Referring now to Figure 2, it will be seen that the body 5 is formed with rim engaging beads 11 which are spaced from one another a distance approximately equal to the distance between the inner edges of the beads shown in Figure 1, so that the beads 11 can be passed between the corresponding beads of the wheel-rim without interference. In this connection, it should be understood that Figure 1 shows the tire inflated whereas Figure 2 shows it deflated or in its primary shape or condition. In other words, when the tire is manufactured, it is formed with an inwardly bowed portion 12 which is flexible and capable of being forced outward by pressure of the air in the tire. In thus pressing the bowed portion 12 outward, it causes the beads 11 to become more widely separated or spaced, and if the tire is seated on a clincher rim when these beads are forced outward, they engage with the corresponding beads of the rim and secure the tire in position on the rim. However, when the tire is deflated, the inherent resiliency of the bowed portion 12 causes it to resume its initial or primary shape, and in doing so, it draws the beads 11 toward one another and renders the tire easily removed from the rim.

In Figure 3, the beads 11 are replaced by beads 11' which have vertical sides and are adapted to fit between the retaining flanges of a rim of the demountable type. When this tire is inflated, its bowed portion 12' causes a sufficient spreading of the bead 11' to increase the friction of these beads against the retaining flanges.

Having thus described our invention, what we claim is:

A pneumatic puncture proof tire comprising an outer normally contracted casing, a flexible inner tube expansible within said outer casing and adapted to force the spreading of the outer casing when said inner tube is inflated, an undulated reinforcing covering for said inner tube arranged on the inner face of the portion of said inner tube opposite the tread portion of the outer casing.

In testimony whereof, we affix our signatures.

DOYLE PATCHIN.
GEORGE PATCHIN.